United States Patent [19]

Pracas

[11] Patent Number: 5,083,962
[45] Date of Patent: Jan. 28, 1992

[54] DOLL CAPABLE OF BODILY FUNCTIONS

[76] Inventor: Victor M. Pracas, 32 Challenger Ave., Parmelia, Western Australia, 6167, Australia

[21] Appl. No.: 466,271

[22] PCT Filed: Aug. 24, 1988

[86] PCT No.: PCT/AU88/00319
§ 371 Date: Feb. 20, 1990
§ 102(e) Date: Feb. 20, 1990

[87] PCT Pub. No.: WO89/01812
PCT Pub. Date: Mar. 9, 1989

[30] Foreign Application Priority Data
Aug. 24, 1987 [AU] Australia .................. PI3924

[51] Int. Cl.⁵ .................. A63H 3/31; A63H 3/24; G09B 23/28
[52] U.S. Cl. .................. 446/184; 446/190; 446/305; 434/268; 434/273
[58] Field of Search .................. 446/304, 305, 184, 190; 434/268

[56] References Cited

U.S. PATENT DOCUMENTS

| | | | |
|---|---|---|---|
| 2,551,433 | 5/1951 | Graves . | |
| 3,855,729 | 12/1974 | Sapkus et al. | 446/190 X |
| 3,858,352 | 1/1975 | Cummings et al. | 446/305 |
| 3,916,561 | 11/1975 | Kato | 446/190 |
| 4,151,675 | 5/1979 | Juan | 446/305 |
| 4,443,200 | 4/1984 | Murrphy | 446/305 X |
| 4,504,241 | 3/1985 | Dyson et al. | 446/304 |

FOREIGN PATENT DOCUMENTS

| | | |
|---|---|---|
| 411090 | 3/1925 | Fed. Rep. of Germany ...... 446/305 |
| 1905684 | 8/1970 | Fed. Rep. of Germany . |
| 2059237 | 6/1971 | Fed. Rep. of Germany . |
| 2216008 | 10/1973 | Fed. Rep. of Germany . |
| 1099190 | 8/1955 | France . |
| 2366855 | 5/1978 | France ................... 446/304 |
| 2448368 | 9/1980 | France . |
| 2554360 | 5/1985 | France . |
| 1176168 | 1/1970 | United Kingdom . |
| 1454601 | 11/1976 | United Kingdom . |
| 2068753 | 8/1981 | United Kingdom . |
| 2177611 | 1/1987 | United Kingdom . |

*Primary Examiner*—Mickey Yu
*Attorney, Agent, or Firm*—Reising, Ethington, Barnard, Perry & Milton

[57] ABSTRACT

The present invention provides a doll (10) which is arranged to be fed both liquids and non-liquids or solids. These are received in respective first and second chambers (20, 22). The present invention also provides a chamber pot (b 54) for a doll (10). Further, the present invention provides a casing (98) for enclosing or enveloping a doll (10) to simulate the womb. The present invention allows for a visual explanation of childbirth and childcare to be given to young children. This may be supplemented by instructions from another source, e.g. an adult or text.

10 Claims, 12 Drawing Sheets

DOLL CAPABLE OF BODILY FUNCTIONS

The present invention relates to a doll, a chamber pot for a doll and to a casing for enclosing or enveloping a doll.

FIELD OF THE INVENTION

The present invention provides a doll which is arranged to be fed both liquids and non-liquids or solids. These are received in respective first and second chambers The present invention also provides a chamber pot for a doll.

Further, the present invention provides a casing for enclosing or enveloping a doll to simulate the womb. The present invention allows for a visual explanation of childbirth and childcare to be given to young children. This may be supplemented by instructions from another source, e.g. an adult or a text.

SUMMARY OF THE INVENTION

In accordance with a first aspect of the present invention there is provided a doll comprising first chamber means arranged to receive liquid fed to said doll, second chamber means arranged to receive non-liquid material fed to said doll and discharge means for discharging said liquid and non-liquid material from said first chamber and said second chamber, respectively.

In accordance with a second aspect of the present invention there is provided a chamber pot for a doll comprising a central cavity surrounded by wall means wherein at a front part of said chamber pot said wall means is provided with a pair of contoured recesses such that when a doll is seated on said chamber pot the legs of said doll are received in a respective contoured recess.

In accordance with a third aspect of the present invention there is provided a casing for enclosing a doll comprising an opening and a tube extending from said casing said tube having a distal end and a proximal end and being arranged such that it is containable in said casing, and the distal end of said tube is arranged to be connected to said doll.

DESCRIPTION OF THE INVENTION

Figure 1:
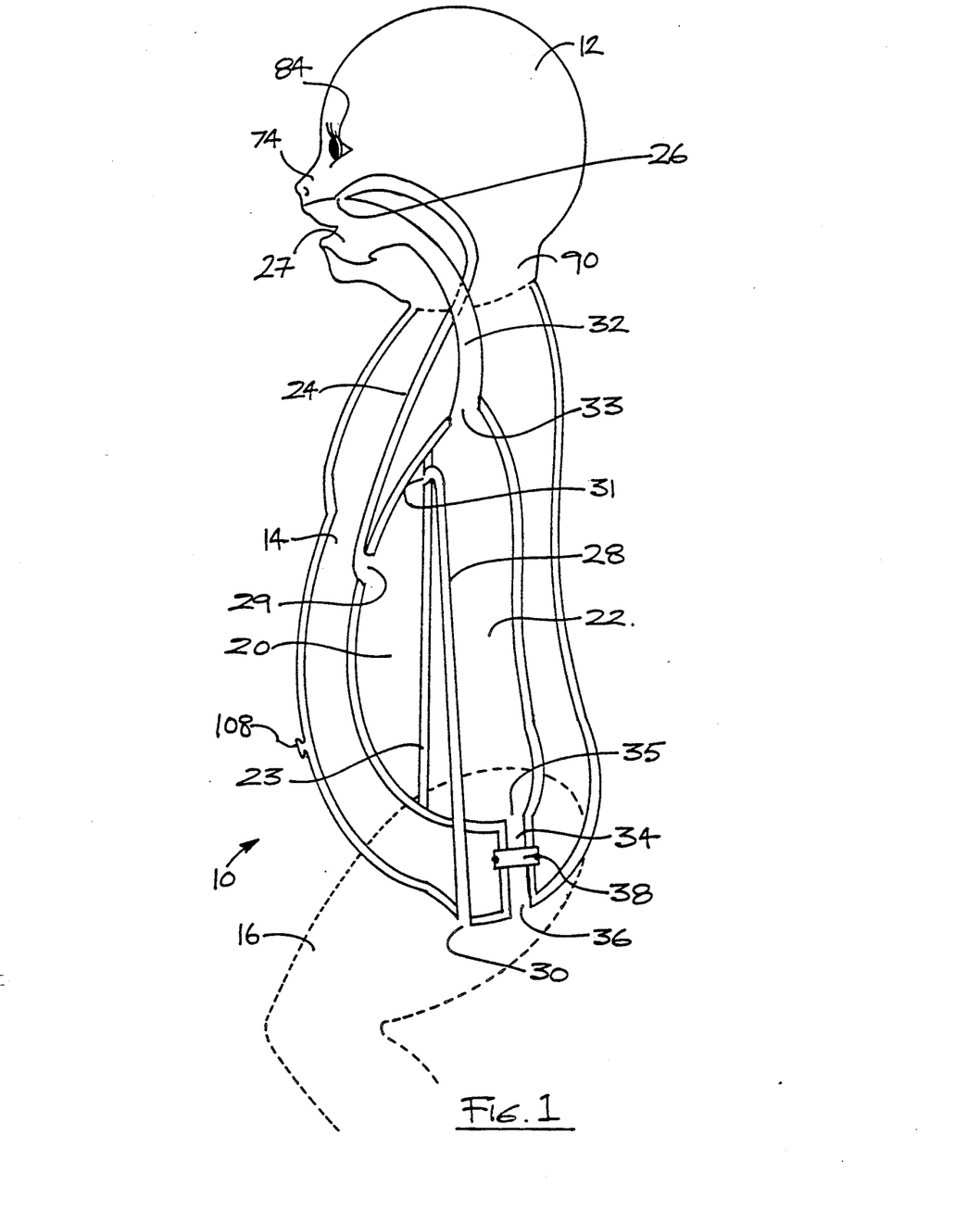
FIG. 1 is a side view of a doll in accordance with the present invention showing the principal internal features.

In FIG. 1 there is shown a doll 10 in the form of a human infant.

The doll 10 comprises a head 12, torso 14 and legs 16. Arms 18 (shown in FIGS. 19 and 20) are also provided, but have been omitted from FIG. 1 for clarity.

The doll 10 is provided with a first chamber 20 and a second chamber 22 located in the torso 14. The first chamber 20 and second chamber 22 are separated by a wall 23.

The first chamber 20 is arranged to receive liquids that may be fed to the doll 10 and the second chamber 22 is arranged to receive non-liquids or solids that may be fed to the doll 10.

The liquids and non-liquids or solids that are fed to the doll 10 are analogous to beverages and foods that may be fed to live human infants.

A first tube 24 connects the first chamber 20 with an aperture 26 located in the roof of the mouth 27 of the doll 10. The first tube 24 terminates at an inlet opening 29 into the first chamber 20.

A second tube 28 leads from an outlet opening 31 of the first chamber 20 to a discharge opening 30 located in the groin region of the doll 10.

The inlet opening 30 is positioned at a lower part of the first chamber 20 than the outlet opening 31. Preferably, the inlet opening 30 is positioned in substantially the mid region of the first chamber 20 relative to when the doll 10 is in an upright position as shown in FIG. 1.

Preferably, the outlet opening 31 is positioned in substantially the upper region of the first chamber 20 relative to when the doll 10 is in an upright position as shown in FIG. 1.

Accordingly, when the doll 10 is to be fed liquids, the doll 10 is positioned in a substantially upright position or a cradled position.

Liquids may then be fed to the doll 10 by using a container having a suitably shaped nozzle which engages in the aperture 26.

The liquid then travels along the first tube 24 and enters the first chamber 20 via the inlet opening 30. Since the doll 10 is in a substantially upright position or cradled position when being fed a liquid, the liquid entering the first chamber 20 collects at the lower region thereof. Thus, the liquid is unable to flow from the outlet opening 31 since the level of liquid in the first chamber 20 will be below the level of the outlet opening 31. When the doll 10 is positioned in a recumbent position on its back, the liquid in the first chamber 20 will exit via the outlet opening 31, since the outlet opening will then be at, or below, the level of the liquid in the first chamber 20. The liquid then travels along the second tube 28 and is discharged via the discharge opening 30.

Accordingly, discharge of liquid from the doll 10 when it is in a recumbent position is analogous to a live human infant wetting when lying down, e.g. when sleeping.

A third tube 32 connects the second chamber 22 with the mouth 27 of the doll 10. The third tube 32 terminates at an inlet opening 33 into second chamber 22.

A fourth tube 34 leads from an outlet opening 35 of the second chamber 22 to a discharge opening 36.

Non-liquids or solids may be fed to the doll 10 by pushing them to the back of the mouth 27. The non-liquids or solids slide down the third tube 32 and into the second chamber 22 via the inlet opening 33. The non-liquids or solids entering the second chamber 22 collect at the lower region thereof.

The fourth tube 34 is provided with a valve 38 to control discharge of non-liquids or solids from the second chamber 22.

Figure 6:
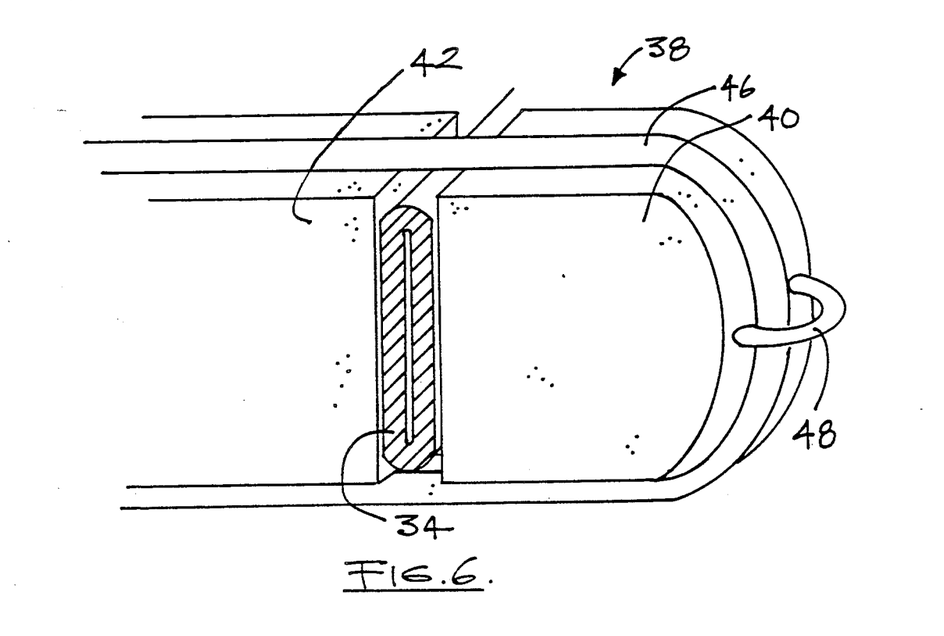
FIG. 6 is another perspective view of the valve shown in FIGS. 2 and 3 with the valve in a closed position and showing the surrounding band.
Figure 7:
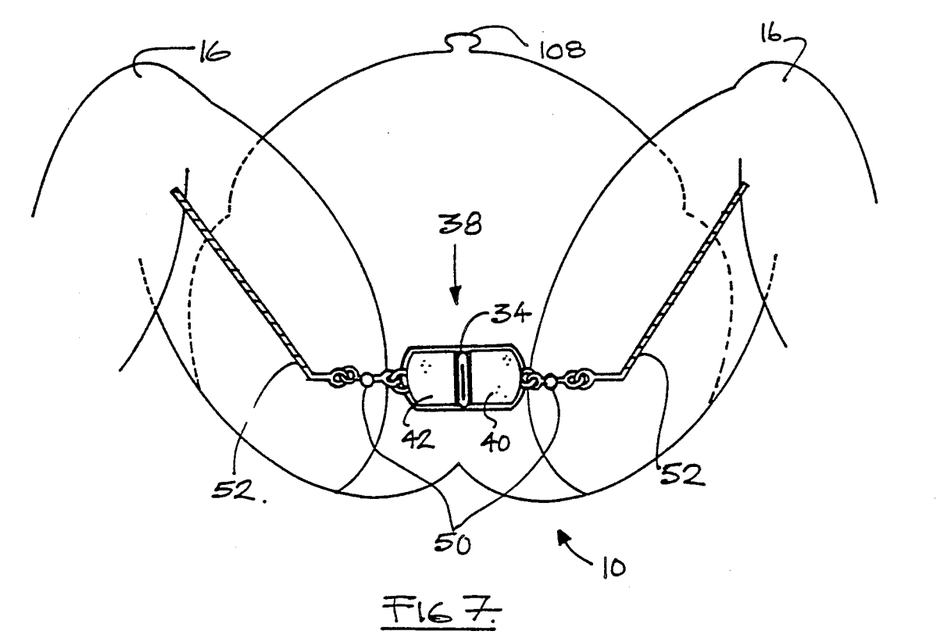
FIG. 7 shows the valve of FIGS. 2, 3 and 6 in the closed position in its location in the doll.
Figure 8:
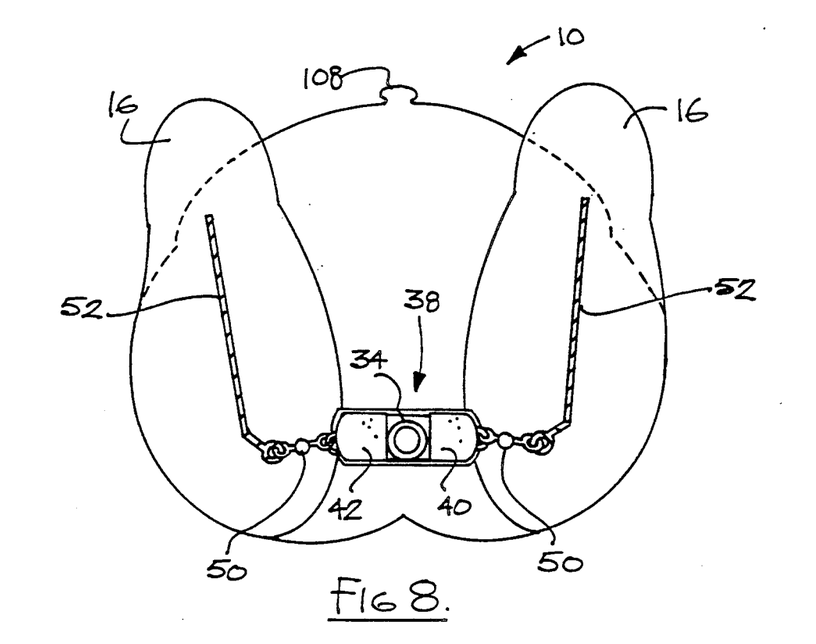
FIG. 8 shows the valve of FIGS. 2, 3 and 6 in the open position in its location in the doll.

The tubes 24, 28, 32 and 34 thus act as passages for conveying the liquids and non-liquids or solids to and from the first and second chambers 20 and 22. The valve 38 is shown separately in FIGS. 2 to 6. The location of the valve 38 in the doll 10 is shown in FIGS. 1, 7 and 8.

Figure 2:
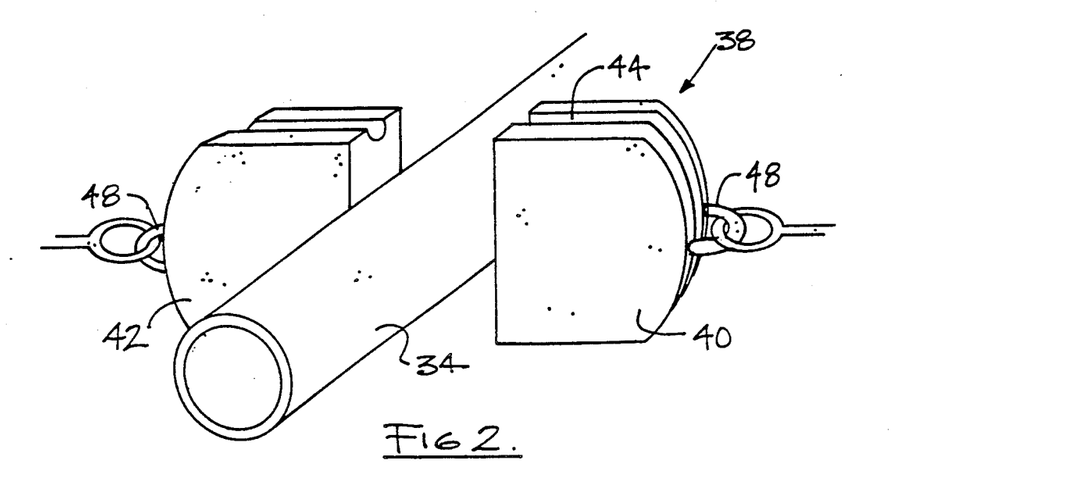
FIG. 2 is a perspective view of the valve for controlling discharge of solids, in the open position.
Figure 3:
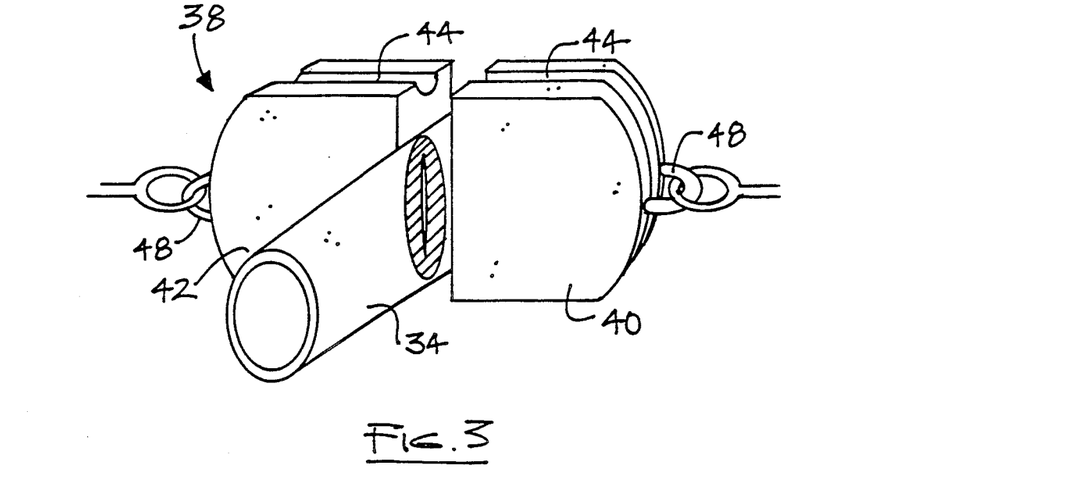
FIG. 3 is a perspective view of the valve shown in FIG. 2 in the closed position.
Figure 4:
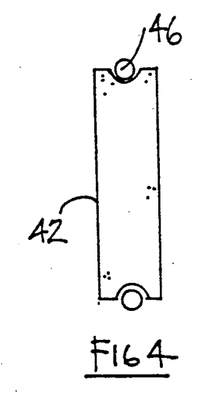
FIG. 4 is an end view of one of the valve members of the valve shown in FIGS. 2 and 3.
Figure 5:
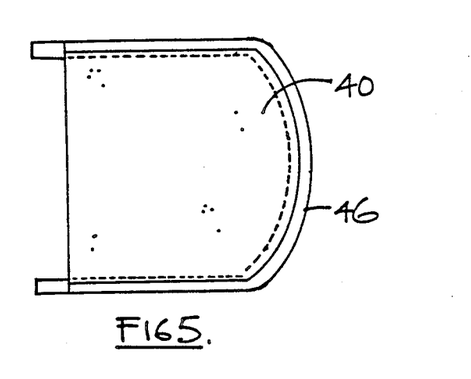
FIG. 5 is a front view of the other of the valve members of the valve shown in FIGS. 2 and 3.

The valve 38 comprises a first member 40 and a second member 42.

Each valve member 40 and 42 is provided with a groove 44 on its outer edge. An elasticated or rubber band 46 is positioned in the groove 44 to force the valve members 40 and 42 toward one another, thereby closing the valve 38 as shown in FIGS. 3 and 6. The band 46 has, however, been omitted from FIGS. 2 and 3 for clarity.

The band 46 biases the valve members 40 and 42 toward one another thus compressing the fourth tube 34 as shown in FIGS. 3 and 6. Such compression of the fourth tube 34 prevents non-liquids or solids in the second chamber 22 from being discharged therefrom via the discharge opening 36 since the valve 38 is in the closed position.

However, when the band 46 is stretched the compression of the fourth tube 34 is released and non-liquids or solids may be discharged from the discharge opening 36.

Each valve member 40 and 42 is provided with a D-ring 48. Swivellable links 50 connect the D-rings 48 with rods 52 located in the legs 16 of the doll 10, as shown in FIGS. 7 and 8.

In the normal position, the legs 16 are in the spread apart position, shown in FIG. 7. The rods 52 retain the legs 16 in the spread apart position. In this position, the band 46 retains the valve 38 in the closed position, as previously described.

When the legs 16 are moved toward one another, the valve members 40 and 42 are forced to move away from each other, due to the action of the swivellable links 50 and the rods 52. The valve members 40 and 42 are thus forced to move apart against the force of the band 46 to release the compression of the fourth tube 34 and thereby opening the valve 38. This is shown in FIG. 8. Non-liquids or solids will then be able to be discharged from the discharge opening 36.

The present invention also provides a chamber pot. The non-liquids or solids may be caused to discharge from the second chamber 22 by seating the doll 10 in a chamber pot 54 shown in FIGS. 9, 10 and 11.

Figure 9:
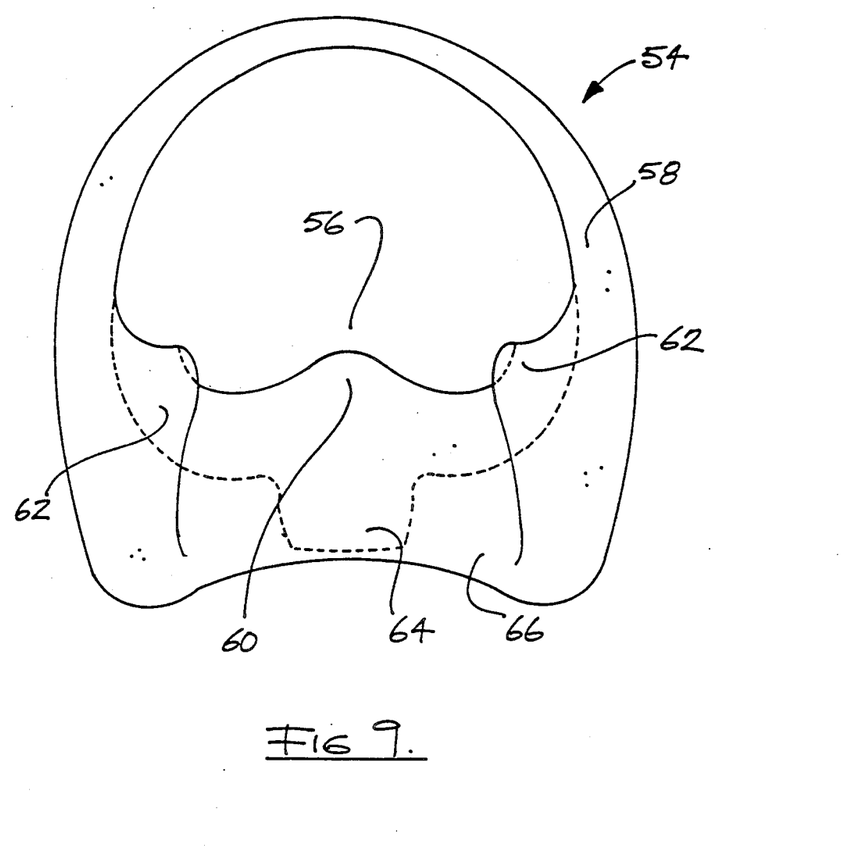
FIG. 9 shows a front view of a chamber pot that may be used with the doll.
Figure 10:
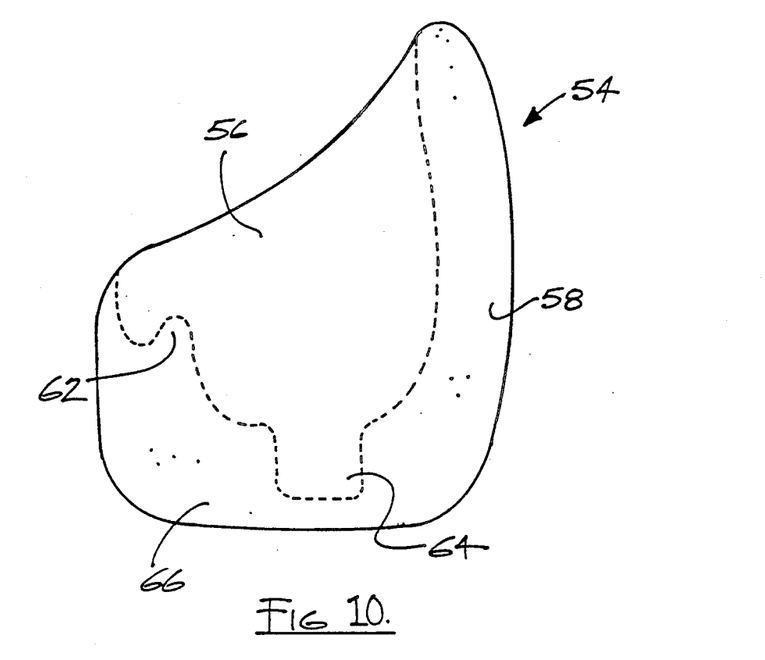
FIG. 10 shows a side sectional view of the chamber pot shown in FIG. 9.
Figure 11:
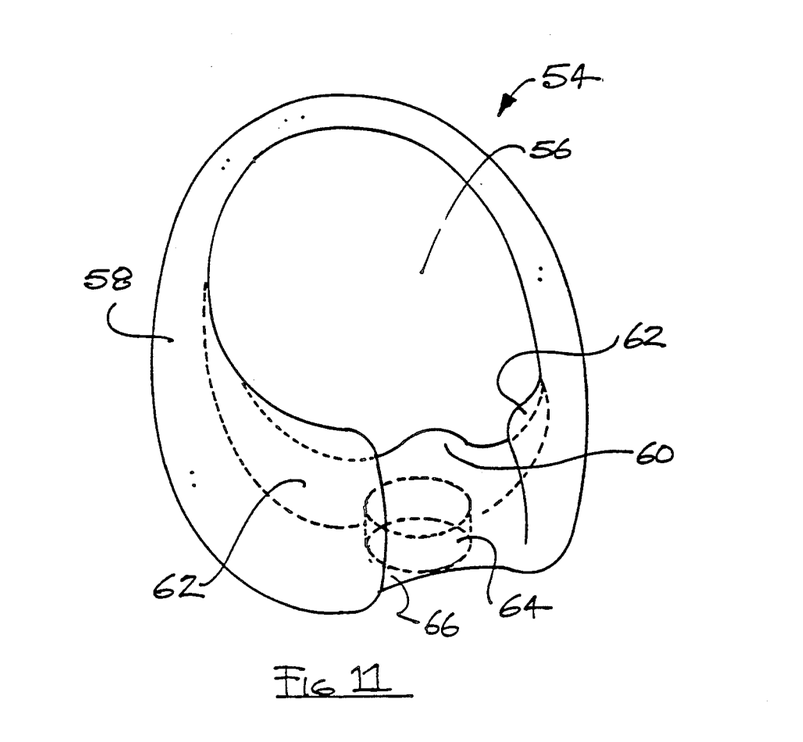
FIG. 11 shows a perspective view of the chamber pot shown in FIGS. 9 and 10.

The chamber pot 54 comprises a central cavity 56 surrounded by a wall 58 tapering downwardly from the rear to the front of the pot 54. At the front of the pot 54, the upper edge of the wall 58 is contoured in a substantially "W" shape, upon which the undersides of the legs 16 of the doll 10 rest, as generally indicated by reference numeral 60. At the front of the pot 54, the wall 58 is provided with wings 62. The wings 62 may be moulded integrally with the pot 54.

A recess 64 is provided in the base 66 of the pot 54. When the doll 10 is seated on the pot 54, the wings 62 maintain the legs 16 of the doll 10 together. In this way the valve 38 is in the open position, shown in FIGS. 2 and 8, to allow the non-liquids or solids to discharge from the second chamber 22 via the discharge opening 36.

The recess 64 is provided in the base 66 of the pot 54 to receive the discharged non-liquids or solids.

Figure 12:
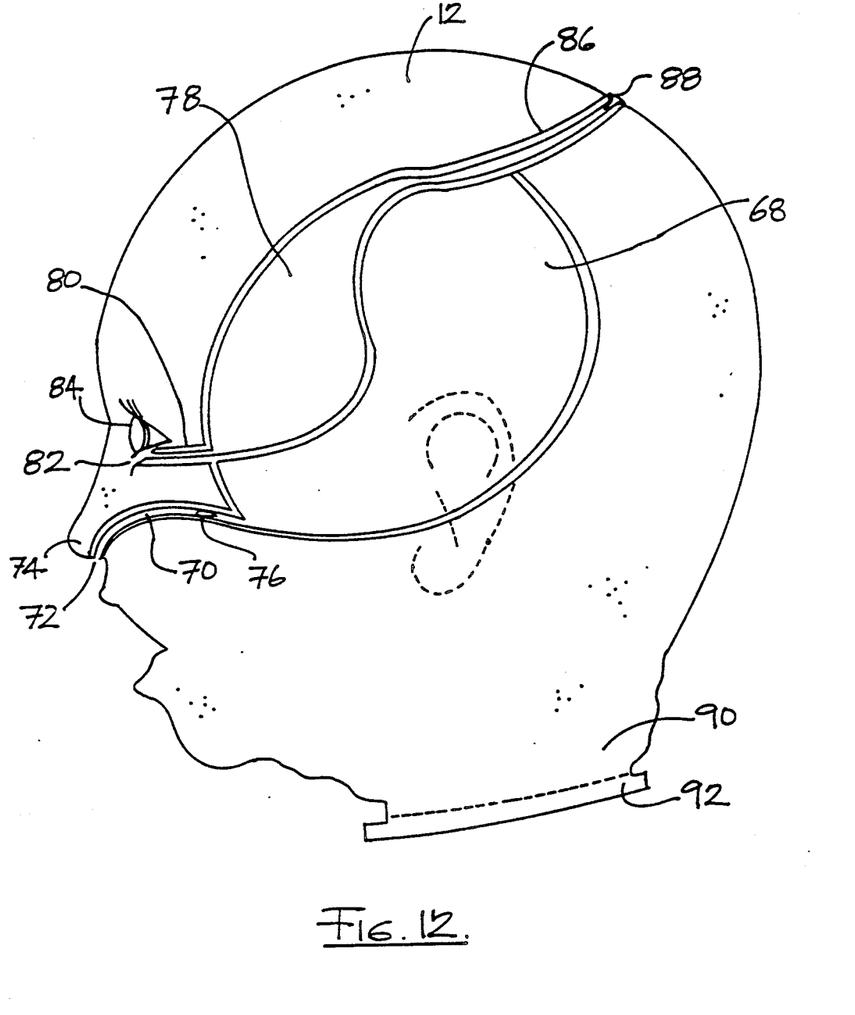
FIG. 12 shows the head of the doll and the internal features thereof.

In FIG. 12, there is shown the head 12 of the doll 10. The head 12 of the doll 10 may be provided with an air chamber 68. A tube 70 connects the air chamber 68 with an opening 72 located in the nose 74 of the doll 10. The opening 72 could also be provided near the mouth 27. A whistle device 76 is located in the tube 70, as shown in enlarged form in FIG. 13.

Figure 13:
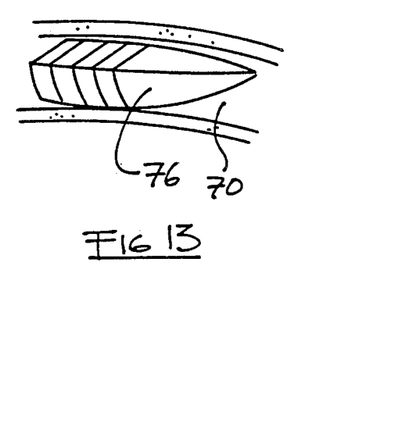
FIG. 13 shows the whistle device located in the head of the doll.
Figure 14:
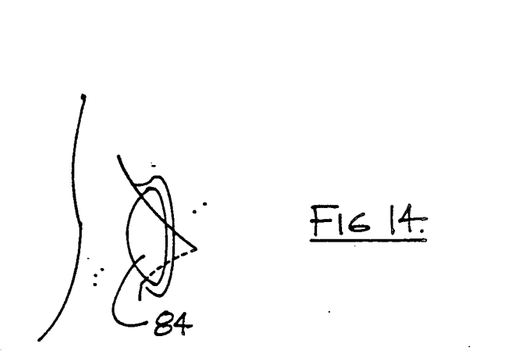
FIG. 14 shows an eye of the doll.

When the head 12 is squeezed, air in the air chamber 68 is forced out through the tube 70. This rush of air through the whistle device 76 causes the whistle device 76 to make a sound, simulating the cry of a live human infant.

The head 12 may also be provided with a liquid chamber 78.

Figure 15:
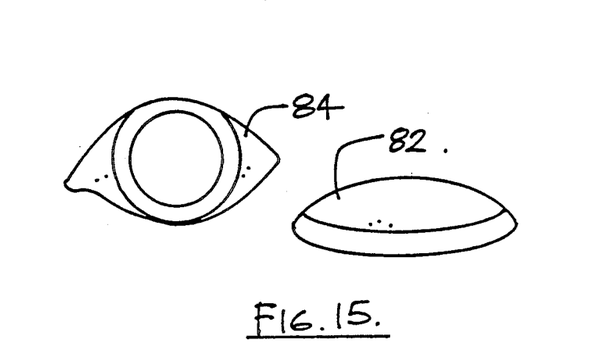
FIG. 15 is a front view of an eye of the doll and a tear opening.

A tube 80 connects the liquid chamber 78 with an opening 82 located beneath each eye 84 of the doll 10, as shown in FIGS. 12 and 15.

Figure 16:
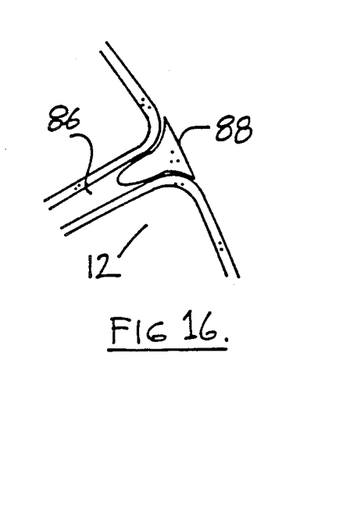
FIG. 16 shows a plug located in the rear of the head of the doll.

Liquid, e.g. water, may be poured into the chamber 78 via a filling tube 86. The filling tube 86 connected to the chamber 78 is normally closed with a plug 88, as shown in FIG. 16.

When the head 12 is squeezed, liquid in the liquid chamber 78 is forced out through the opening 82, simulating tears of a live human infant.

Accordingly, the provision of the air chamber 68 and whistle device 76, and the liquid chamber 78 permit the doll 10 to simulate a crying live human infant when the head 12 of the doll 10 is squeezed.

Figure 17:
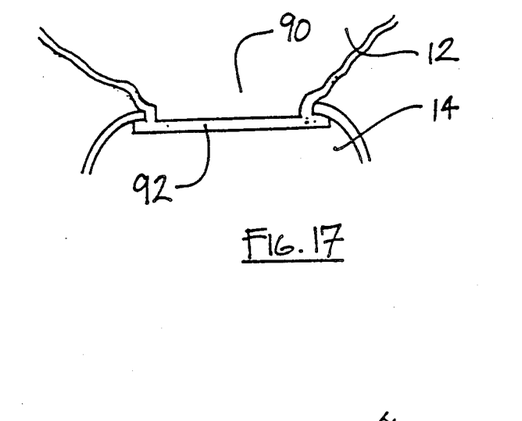
FIG. 17 shows the connection of the head of the doll to the torso thereof.
Figure 18:
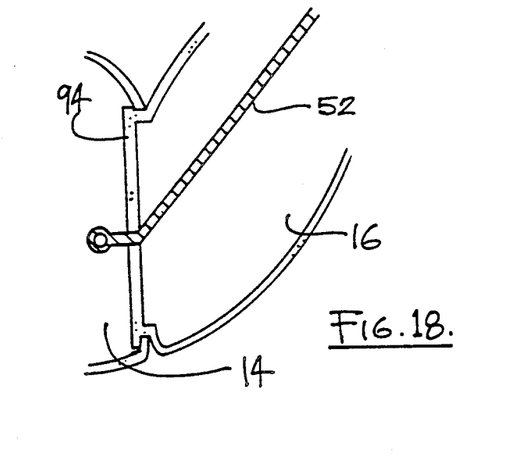
FIG. 18 shows the connection of a leg of the doll to the torso thereof.
Figure 19:
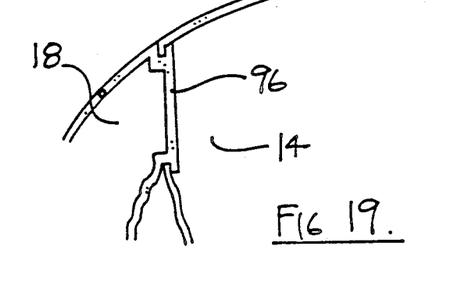
FIG. 19 shows the connection of an arm of the doll to the torso thereof.

FIGS. 17, 18 and 19 show the manner in which the head 12, legs 16 and arms 18, respectively, are attached to the torso 14.

The lower portion of the head 12 defines a neck 90. The base of the neck 90 is provided with a flange 92 which engages in an opening in the upper portion of the torso 14, as shown in FIG. 17.

The proximal end of each leg 16 is provided with a flange 94 which engages in a respective leg opening in the lower portion of the torso 14, as shown in FIG. 18.

In a similar manner, the proximal end of each arm 18 is provided with a flange 96 which engages in a respective arm opening in the upper portion of the torso 14, as shown in FIG. 19.

The doll 10 may be made from any suitable materials. Preferably, the outer wall of the doll 10 is made of rubber and the interior filled with polyurethane foam.

The various components of the valve 38 and the rods 52 are, preferably, made of nylon.

The present invention also provides a casing for enclosing or enveloping a doll.

Figure 20:
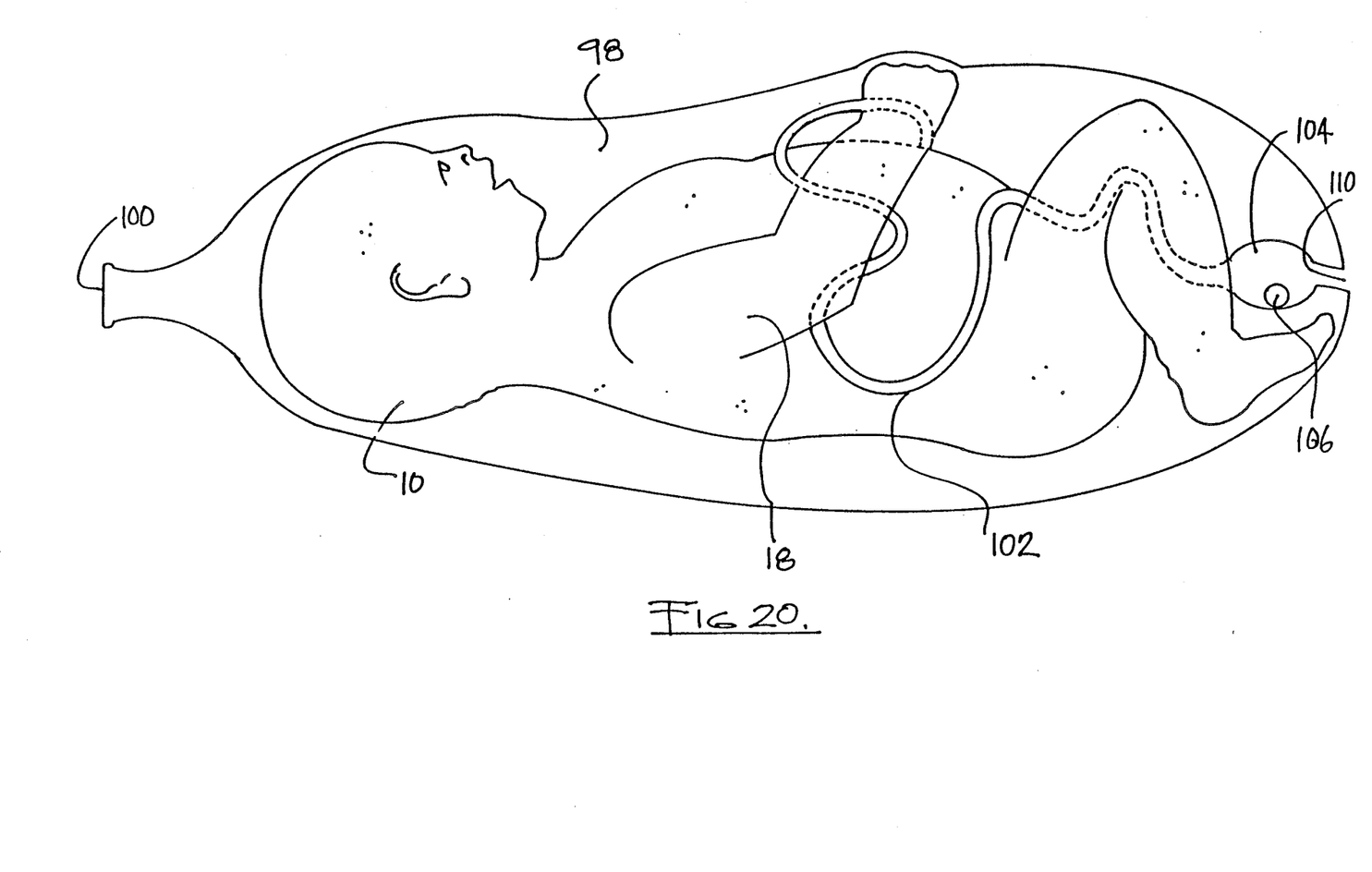
FIG. 20 shows the doll enveloped in a casing or balloon.

A casing or balloon 98 may be provided to enclose or envelop the doll 10, as shown in FIG. 20, when the doll 10 is first sold to a consumer.

Figure 21:
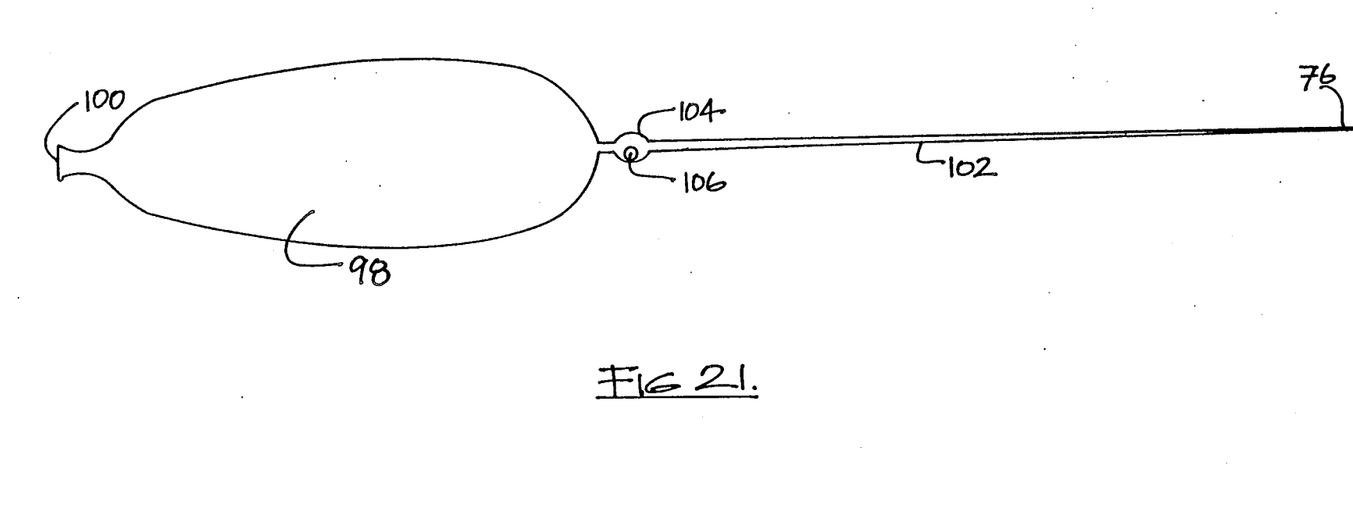
FIG. 21 shows the casing or balloon separately.
Figures 22, 23, 24, 25:
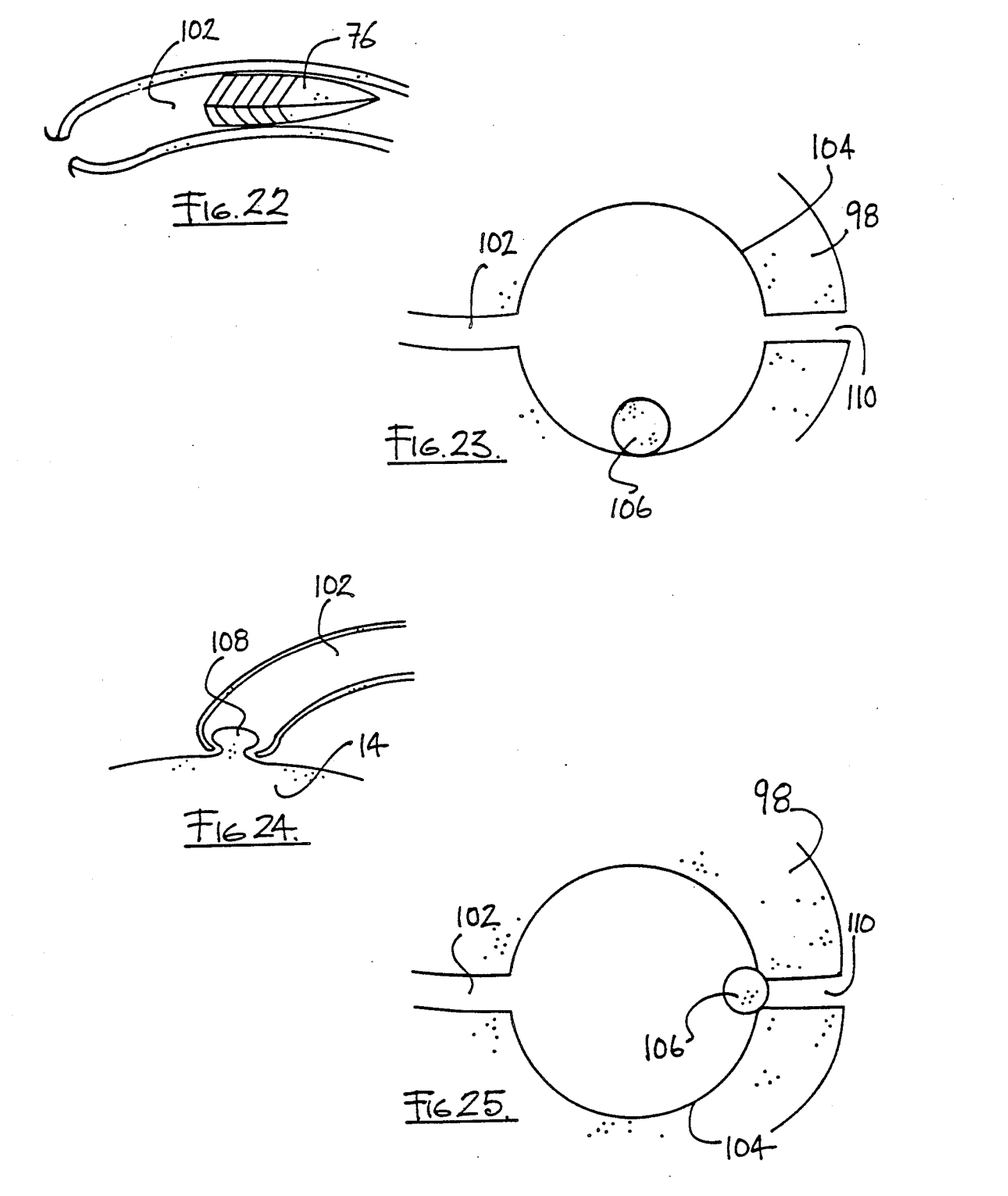
FIG. 22 shows a whistle device located in the tube of the casing or balloon.
FIG. 23 shows an enlarged portion of the tube of the casing or balloon containing a ball.
FIG. 24 shows the connection of the tube of the casing or balloon to a knob on the torso of the doll.
FIG. 25 shows the ball in the enlarged portion of the tube of the casing or balloon blocking off the opening to the tube.

The casing or balloon 98 is shown separately in FIG. 21. The casing or balloon 98 has an opening 100 at one end thereof and a tube 102 extending from the other end. The distal end of the tube 102 is provided with a whistle device 76, as shown in FIG. 22.

The proximal end of the tube 102 is provided with a portion 104 of increased size. The portion 104 contains a ball 106 of such size that it cannot escape from the portion 104. This is shown in FIG. 23.

In use, the tube 102 is contained inside the casing or balloon 98, as shown in FIG. 20. The doll 10 is also provided inside the casing or balloon 98. The distal end of the tube 102 securely fits over a knob 108 on the torso 14 of the doll 10.

The knob 108 simulates the navel of a human infant. The casing or balloon 98 simulates the womb of a pregnant human female and the tube 102 simulates the umbilical cord. When the doll 10 is purchased by a consumer it is, preferably, enclosed or enveloped in the casing or balloon 98 with the tube 102 connected to the knob 108, as shown in FIG. 20.

The birth of a human infant may then be simulated in the following manner.

A fluid e.g. air or water, is used to fill the casing or balloon 98 via the opening 100. The opening 100 is then sealed by tying a knot in the end of the casing or balloon 98.

A quantity of air is then blown into the tube 102 via the opening 110. This increases the pressure in the tube 102 and when the source of air flow, e.g. a person's mouth, is removed from the opening 110, the air rushes out of the tube 102, causing the ball 106 to block off the opening 110. In this way, there will still be some air under pressure in the tube 102.

Actual delivery of a human infant from the womb is simulated by cutting or breaking off the end of the casing or balloon 98 having the opening 100. This causes the fluid in the casing or balloon to empty out simulating the discharge during human childbirth.

The doll 10 is then extracted from the casing or balloon 98 simulating delivery of a human infant.

The tube 102 is then removed from the knob 108, simulating severing of the umbilical cord. This causes the air that remained in the tube 102 to rush out therefrom via the distal end of the tube 102. In so doing, the whistle device 76, at the distal end of the tube 102, is caused to emit a sound, simulating the first cry of a human infant at birth. The casing or balloon 98 may be made of any suitable material, eg, of plastics, rubber compounds, latex. The balloon 98 may then be discarded.

The use of the casing or balloon 98 is not restricted in its application to a doll 10 in accordance with the present invention, and may be used with other dolls.

The present invention allows for a visual explanation of childbirth and childcare to be given to young children and may be supplemented with instructions from appropriate texts or other source.

Modifications and variations such as would be apparent to a skilled addressee are deemed within the scope of the present invention.

I claim:

1. A doll comprising:

first chamber means arranged to receive liquid fed to said doll;

second chamber means arranged to receive non-liquid material fed to said doll;

first discharge means for discharging said liquid from said first chamber means;

second discharge means for discharging said nonliquid material from said second chamber means;

said first discharge means comprises an outlet opening of said first chamber means and said second discharge means comprises first tube means and valve means, such that said liquid material is dischargeable from said first chamber means to freely flow therefrom via said outlet opening only when said doll is in a substantially recumbent position and said valve means is operable on said first tube means too control the discharge of non-liquid material from said second chamber means.

2. A doll according to claim 1, wherein said first discharge means further comprises second tube means leading from said outlet opening to a first discharge opening, and said first tube means of said second discharge means leads from an outlet opening of said second chamber means to a second discharge opening.

3. A doll according to claim 1, wherein said first chamber means comprises an inlet opening for entry of said liquid and said liquid is retained in said first chamber means when said doll is in a substantially upright position and discharged therefrom via said first discharge means only when said doll is placed in a substantially recumbent position, and said second chamber means comprises an inlet opening for an entry of said non-liquid material.

4. A doll according to claim 1, wherein said valve means comprises a pair f valve members biased together under influence of biasing means to maintain said valve means in a closed position and a portion of said first tube means is positioned between said valve members and compressed thereby to close of said first tube means and prevent discharge of non-liquid material.

5. A doll according to claim 1, wherein said doll further comprises an air chamber which is in communication with the outside of said doll via a passage which contains a sound emitting device such that when said air chamber is compressed air is forced therefrom via said passage and causes said sound emitting device to emit a sound.

6. A doll according to claim 5, characterized in that said air chamber is provided in the head of said doll and said passage terminates in an opening in the vicinity of the mouth or nose of said doll.

7. A doll according to claim 1, wherein said doll further comprises a liquid chamber provided in the head of said doll and in communication with at least one opening to the outside of said doll via a passage, said at least one opening being in the vicinity of at least one of the eyes of said doll such that when said liquid chamber is compressed liquid inn said liquid chamber is forced therefrom through said passage and out of said at least one opening.

8. A doll according to claim 3, said doll further comprising a head having a mouth, wherein third tube means connects said inlet opening of said first chamber means with ann opening in said mouth and fourth tube means connects said inlet opening of said second chamber means with said mouth such that said liquid and said non-liquid material fed to said doll are delivered to said first and second chamber means, respectively.

9. A doll according to claim 4, wherein said doll further comprises a pair of legs which contain respective rod means which are connected to a respective said valve member such that when said valve means is in said closed position said legs are in a spread apart position and when said legs are brought together said valve members move apart against said influence of said biasing means to thereby release said first tube means and open said valve means to allow non-liquid material to be discharged from said second chamber means.

10. A doll according to claim 8, wherein when said doll is in a substantially upright position said outlet opening of said first chamber means is located above said inlet opening of said first chamber means and when said doll is in a substantially recumbent position said outlet opening of said first chamber means is located below said inlet opening of said first chamber means such that said liquid is able to freely flow from said first chamber means.

* * * * *